I. A. WEAVER.
TIRE CHANGING MECHANISM.
APPLICATION FILED FEB. 20, 1919.
1,341,729.
Patented June 1, 1920.
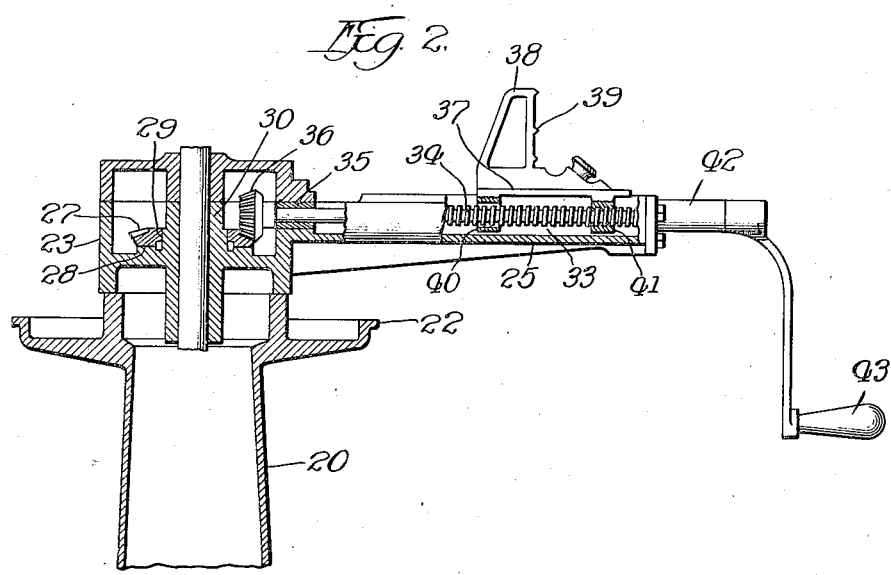
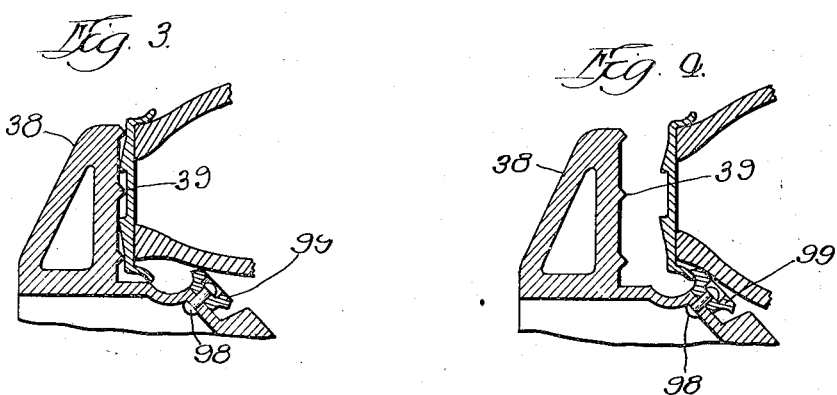

UNITED STATES PATENT OFFICE.

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

TIRE-CHANGING MECHANISM.

1,341,729.         Specification of Letters Patent.         Patented June 1, 1920.

Original application filed October 17, 1917, Serial No. 197,010. Divided and this application filed February 20, 1919. Serial No. 278,235.

*To all whom it may concern:*

Be it known that I, IRA A. WEAVER, a citizen of the United States, and resident of Springfield, in the county of Sangamon and State of Illinois, have invented certain new and useful Improvements in Tire-Changing Mechanism, of which the following is a specification.

My invention relates to improved and novel means to facilitate the handling of transversely-split or crosswise-divided expandible and contractible vehicle-wheel rims and their tires in the mounting of tires thereon and their removal therefrom. The leading object of the invention is the provision of an appliance of this character which is simple in structure, composed of few parts, economical to manufacture, unlikely to become damaged in service, and effective in the work which it is intended to accomplish.

Various features of novelty and advantage in an appliance embodying this invention will be appreciated by those skilled in the art from an understanding of a preferred embodiment of the invention, such as is presented in the accompanying drawings, forming a part of this specification and throughout the various views of which like reference characters refer to the same parts, and also in the following detailed description of the construction and operation of such appliance.

In these drawings:

Fig. 2 is a fragmentary, vertical section on a reduced scale on line 2—2 of Fig. 1, the parts being viewed in the direction indicated by the arrows, the rim and tire being omitted;

Fig. 3 is a fragmentary, detailed section illustrating the method of expanding a contracted rim; and Fig. 4 is a similar view showing the manner of contracting a rim to permit the removal of the tire-shoe or casing.

Figure 1:
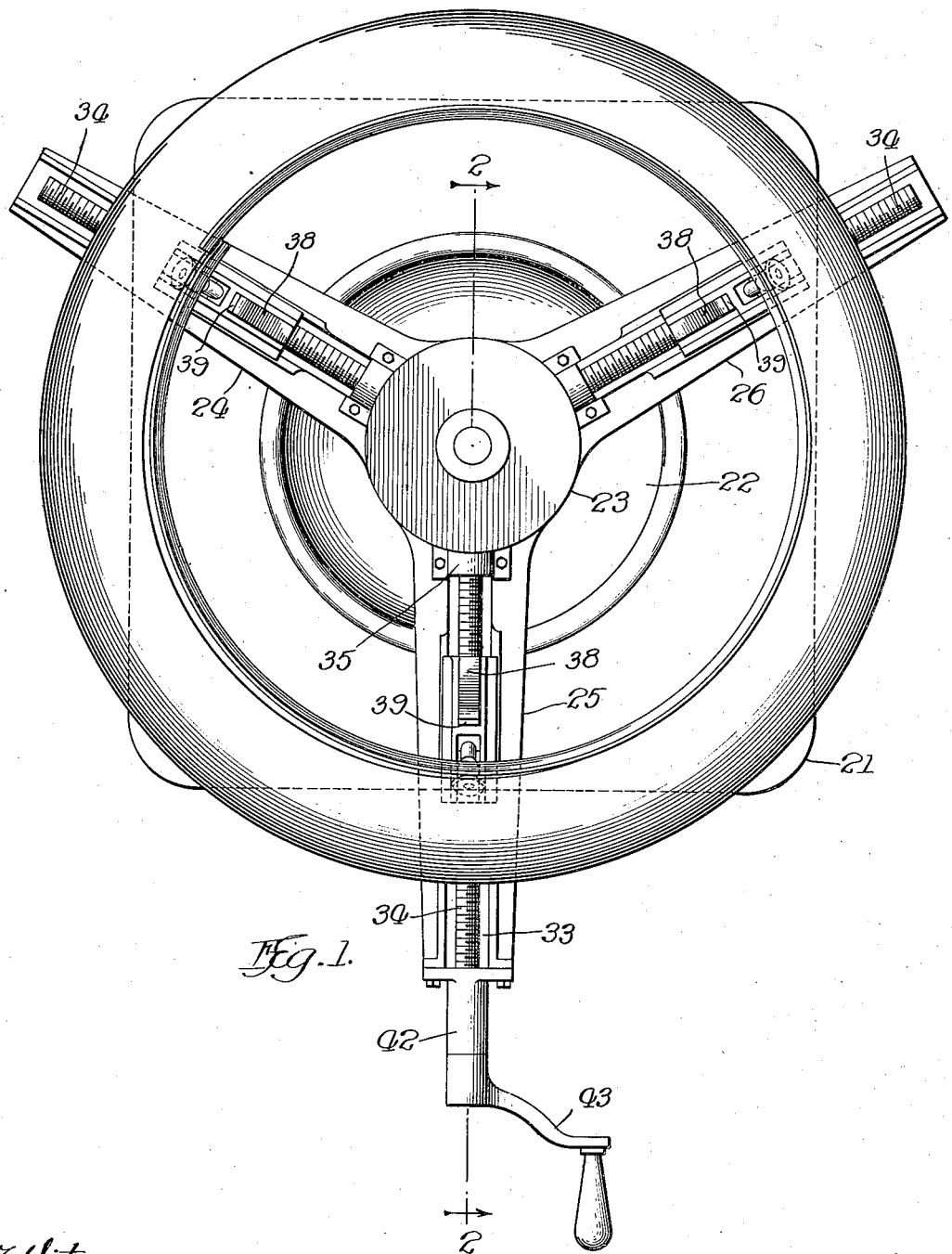
Figure 1 is a plan view of the device with the rim and its tire thereon.

Referring to the drawings, it will be observed that the appliance comprises a hollow standard 20 (Fig. 2) having an extended base 21 (Fig. 1) adapted to rest on the floor and having near its top end an angular, tool-holding shelf or ledge 22. Above this is located a stationary spider comprising a central hub 23 mounted on the standard and three radiating arms 24, 25 and 26, adapted to support, and with their accessory instrumentalities to clamp, the rim and tire to be acted upon. Hub 23 is hollow as shown in Fig. 2 and accommodates within it a horizontal bevel-gear 27 revoluble on bearings 28, 29, the former being flat and the latter cylindrical on the exterior of a central bearing part 30.

Each of the radiating arms 24, 25 and 26 has a longitudinal, undercut depression or groove 33 in its top surface accommodating a screw-threaded shaft 34, a cylindrical inner end portion of which is received in a bearing 35 in the hub 23. The end of each such shaft, protruding into the interior of the hub, has a bevel-pinion 36 (Fig. 2), the teeth of all three of which are in mesh with those of their common central gear 27.

Each spider-arm and its groove is provided with a rim-supporting member 37 bearing and slidable lengthwise thereon and having an upward extension or jaw 38 with a ribbed outer surface 39 adapted to coact with the inner surface of the rim to be manipulated. Each of such slidable and unitedly expandible and contractible members has a pair of depending lugs 40 and 41 accommodated in the corresponding channel 33 of the arm, the inner lug 40 having a cylindrical aperture for the reception of the complementary threaded shaft 34, the outer lug or ear 41 having a threaded bearing for the screw-threaded part of the shaft. The shaft 34 of the arm 25 is somewhat longer than the others, its outer end being revolubly accommodated in a bearing 42 (Figs. 1 and 2) fastened on the end of the arm, the extreme end of the shaft being fitted with a turning or crank handle 43. By manipulation of this handle all of the three jaws 37 may be made to travel simultaneously outwardly or inwardly equal amounts as occasion requires, such members desirably having sliding bearings on the tops of the three arms. It will be clear, therefore, that the three supports or jaws may be simultaneously expanded or contracted by reason of their pinion connections with the common bevel-gear 27.

To enable the appliance to quickly and easily contract crosswise-split rims, such as are commonly used with straight-side tire casings, each of the sliding jaws or members 37 is equipped with an inclined stud 98 (Fig. 4) on which is revolubly mounted a concave or hook-like roller 99 with an enlarged head and reduced neck portion, so as to enable it to engage and partly overlie the lower flange of the rim and prevent the latter from rising out of proper position during the contracting action.

The operation of this apparatus is practically as follows:

Assuming that it is desired to remove the tire casing from a transversely-split rim, the latter is placed on the three supports 37 and then by turning the handle 43 these three members are caused to contract or simultaneously move inwardly bringing the three rollers 99 into engagement with and somewhat overlying the lower flange of the rim, the joint of the rim having been placed on one of the members 37 adjacent to its roller 99. As the handle 43 is turned further, these three rollers, which partly overlie the lower flange of the rim, cause it to contract, the roller near the joint breaking the latter so that the ends of the rim become overlapped or offset permitting removal of the tire. The rollers 99 not only contract the rim, but owing to their hook-like formation they hold it from rising or shifting out of place by slightly overlying or overlapping its lower flange, and, in addition, owing to their shape, they engage the under surface of the tire casing and tend to free it from the rim.

When it becomes necessary to apply the casing to a transversely-split rim, such rim and its casing are placed on the members 37 and then they, by the turning of the handle 43, are expanded, thus enlarging the rim, and when it is sufficiently distended its ends come into register or alinement and are locked or secured together in the usual way.

To those skilled in this art many minor mechanical changes in the appliance will suggest themselves and these may be adopted without departing from the essence of the invention and without sacrificing any of its substantial benefits and advantages.

This application is a division of my earlier application Serial No. 197,010, tire changers, filed October 17, 1917.

I claim:

1. In an appliance of the character described, the combination of an upright standard, a support at the top of said standard, a plurality of members adapted to travel radially on said support, means to simultaneously contract or expand said members, and means on said members adapted to engage and overlie the inner face of the lower flange only of a transversely-split vehicle-wheel rim on the appliance, whereby the rim may be contracted and prevented from rising through the instrumentality of said flange-engaging means during the inward travel of said members, substantially as described.

2. In an appliance of the character described, the combination of an upright standard, a support at the top of said standard, a plurality of members adapted to travel radially on said support, means to simultaneously contract or expand said members, and concave rollers on said members adapted to engage and overlie the inner face of the lower flange only of a transversely-split vehicle-wheel rim on the appliance, whereby the rim may be contracted and prevented from rising through the instrumentality of said rollers during the inward travel of said members, substantially as described.

3. In an appliance of the character described, the combination of an upright standard, a support at the top of said standard, a plurality of members adapted to travel radially on said support, means to simultaneously contract or expand said members, inclined studs on said members, and concave rollers revoluble on said studs adapted to engage and overlie the inner face of the lower flange only of a transversely-split vehicle-wheel rim on the appliance, whereby the rim may be contracted and prevented from rising through the instrumentality of said rollers during the inward travel of said members, substantially as described.

4. In an appliance of the character described, the combination of an upright standard, a plurality of radiating supporting arms at the top of said standard, a plurality of members adapted to travel radially on said arms and to engage the inner portion of and expand a transversely-split vehicle-wheel rim on the appliance during the outward travel of said members, means to simultaneously contract or expand said members, and means on said members adapted to engage and overlie the inner face of the lower flange only of said rim, whereby the rim may be contracted and prevented from rising through the instrumentality of said means during the inward travel of said members, substantially as described.

IRA A. WEAVER.